Dec. 15, 1959          A. SCHEITERLEIN          2,917,226
                   AIR-COOLED ENGINE COMPRESSOR
Filed Oct. 8, 1956                              2 Sheets-Sheet 1
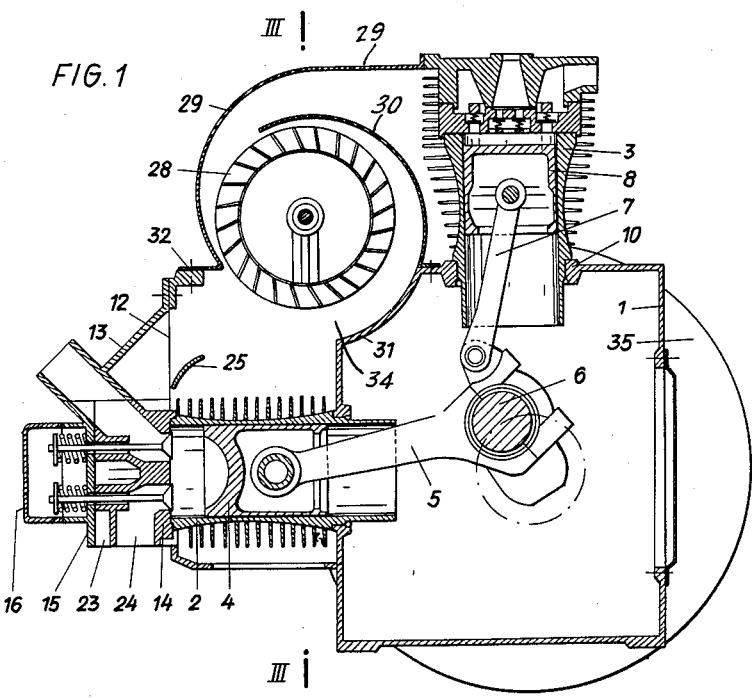
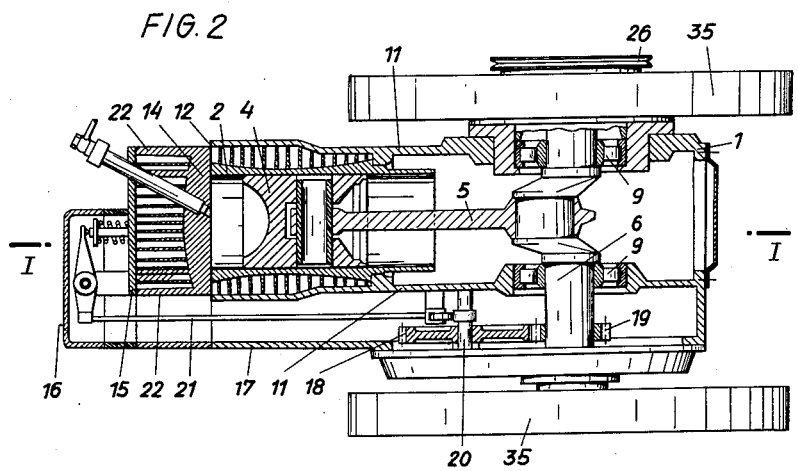
INVENTOR
A. Scheiterlein
BY
Glascott Downing Teeboll
ATTORNEYS Dec. 15, 1959    A. SCHEITERLEIN    2,917,226
AIR-COOLED ENGINE COMPRESSOR
Filed Oct. 8, 1956    2 Sheets-Sheet 2
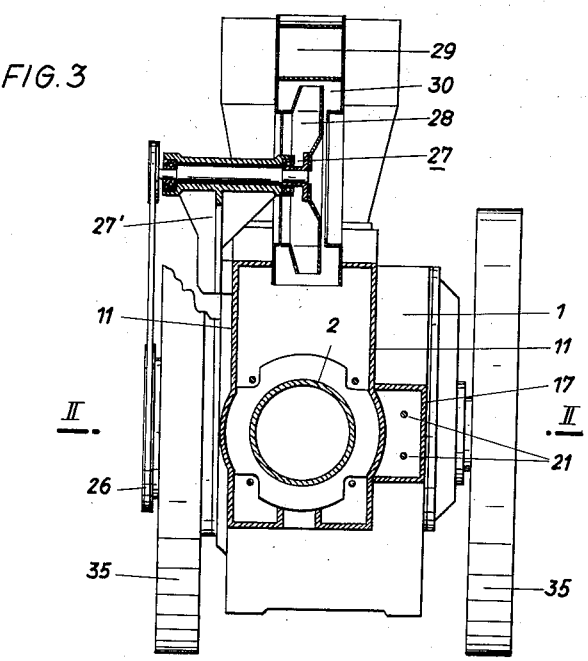
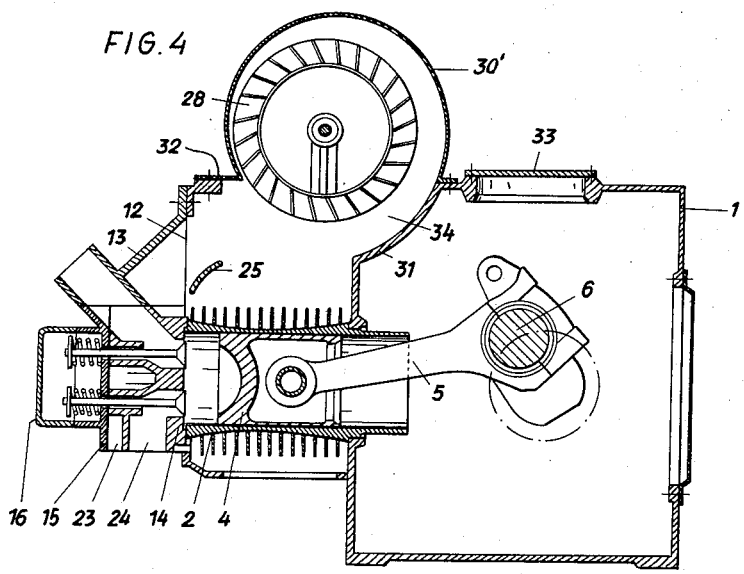
INVENTOR
A. Scheiterlein
BY
Glascock Downing Seebold
ATTORNEYS

United States Patent Office 2,917,226
Patented Dec. 15, 1959

2,917,226

AIR-COOLED ENGINE COMPRESSOR

Andreas Scheiterlein, Graz, Austria, assignor to Hans List, Graz, Austria

Application October 8, 1956, Serial No. 614,460

Claims priority, application Austria January 11, 1956

4 Claims. (Cl. 230—56)

This invention relates to a design of engine compressors where the engine and the compressor cylinder mounted on a common crankcases are perpendicular to each other. The basic purpose of designing similar sets according to the invention consists in the simple and neat grouping of their several units and in the achievement of efficient air-cooling of the engine cylinder and the compressor cylinder at low cost by means of a single blower.

According to the fundamental principle of the invention, the crankcase carries a casing which surrounds the engine cylinder tunnel-like and serves to deliver the air required for cooling the engine cylinder. The blower for the cooling of the engine cylinder and the compressor cylinder is located in the rectangular space between said cylinders on the open side of said casing opposite the compressor cylinder. The air emerging from the rotor of the cooling-air blower, which may be of the turbo-compressor type, has to cover about the same distance to reach the engine cylinder and the compressor cylinder. The casing of the cooling-air blower can be designed as a double spiral in a manner known per se, one of the two spirals delivering the air destined for the cooling of the engine cylinder into the tunnel-like guide casing, whereas the other spiral delivers the air required for the cooling of the compressor cylinder with partial recuperation of its speed energy jointly to the compressor cylinder.

According to a further embodiment of the invention, the guide casing surrounding the engine cylinder comprises sidewalls extending on the outer surface of the crankcase and perpendicular to the crankshaft axis and possibly containing the crankshaft bearings and interconnected alongside their rim approximately in the area of the engine cylinder head by a closing wall covering the space between these two walls. This closing wall of the guide casing which may be combined with the cylinder head is designed for the purpose of delivering part of the cooling-air directed between the side walls of the guide casing towards the engine cylinder to its cylinder head. This task of the closing wall is facilitated by ribs or baffles located between the sidewalls of the guide casing in the area of the cooling-air current directed towards the engine cylinder.

In order to reduce the size of the engine compressor, the rotor of the cooling-air blower can be arranged parallel to the walls of the guide casing and protrude into the air guide casing. In this case, part of the cooling-air impinges directly upon the outer surface of the engine cylinder at the speed at which it emerges from the rotor of the blower. The shape of the crankcase walls in the vicinity of the rotor is adapted to the design of the spiral volute of the cooling-air blower, thus forming its continuation.

The compressor unit according to the invention offers the advantage of a considerably simpler and more neatly arranged construction as compared with the conventional design where a blower rotor mounted on the crankshaft delivers cooling-air to cylinders, also perpendicular to each other, of the engine and compressor sections. In the conventional types the guide casing comprises a plurality of individual parts of complicated shape involving a considerable increase of weight of the whole unit if these parts are cast.

Other objects and features of the invention will become apparent as the specification proceeds. In the accompanying drawing the invention is illustrated by reference to an engine compressor comprising one engine and one compressor cylinder.

Figure 1 shows a section through the cylinder axes on line I—I of Figure 2,

Figure 2 shows a horizontal section on line II—II of Figure 3,

Figure 3 shows a vertical section on line III—III of Figure 1, and

Figure 4 shows the engine section of the unit which after the removal of the compressor section can be used as a general-purpose driving engine.

On the crankcase 1 the engine cylinder 2 and the compressor cylinder 3 are mounted perpendicular to one another. The piston 4 of the engine section which is of the horizontal internal combustion type with fuel injection, actuates the common crankshaft 6 of the engine and compressor sections of the unit by means of a connecting rod 5. The connecting rod 7 of the compressor piston 8 is articulated on the engine connecting rod 5. The outer walls of the crankcase carrying the crankshaft bearings 9 extend beyond the crankcase, protruding into the area of the engine cylinder head on one side and reaching up to the level of the supporting surface 10 of the crankcase for the compressor cylinder on the other side. The walls 11 are interconnected alongside their rim 12 on the farther side of the crankcase by a roof 13 extending essentially parallel to the crankshaft axis. Together with the walls 11 this roof forms a tunnel-like guide casing for the cooling-air directed towards the engine cylinder—in Figure 1 from above. The roof 13 which can also be combined with the engine cylinder head is so designed that part of the cooling-air inside the walls 11 passes to the engine cylinder head. The engine cylinder head itself comprises the ribbed cylinder cover 14 carrying the valve guide and the injection nozzle as well as part 15 which in turn carries the bearings for the valve levers and supports the valve springs. The control members of the engine section of the unit are housed in a casing 17 located on a front wall 11 of the crankcase, said casing surrounding the pair of drive wheels 18, 19 for the camshaft 20 as well as push rods 21 leading to the valve levers. At the front end of the engine the valve drive is closed by a cover 16. The ribs of the cylinder cover extending preferably parallel to the outer walls 11 of the crankcase are located in a duct laterally closed by walls 22 through which cooling-air passes downwards, emerging at 23 and escaping into the open. The exhaust pipe connection 24 of the engine cylinder head for the combustion gases lies in the middle of the emerging cooling-air current for the engine cylinder head and is also cooled thereby.

Besides, the baffle 25 extending as a reinforcing rib between the sidewalls 11 of the guide casing serve also to supply fresh air to the engine cylinder head.

A cooling-air blower 27 driven by the crankshaft by means of a pulley 26 is mounted on the open side of the guide casing close to the compressor cylinder. The rotor 28 of said blower located between these walls to rotate in a plane parallel to the walls. The housing of the cooling-air blower is of the double-spiral passage bounded by volute-shaped wall type. The spiral 29 of the blower housing receives air for the cooling of the compressor cylinder only, whereas the engine cylinder 2 is furnished with cooling-air through the spiral passage bounded by the volute-shaped wall 30. The relation between the sections of the two spirals corresponds to the relation between the amounts of air required for the cooling of the two cylinders. Thus it will be easy to provide the distribution of cooling-air according to requirements at the time when the design of the blower is selected. The wall 31 of the crankcase is curved following the shape of and forming an extension of the wall 30 and constitutes an extension of same extending into the guide casing 34.

Instead of attaching the cooling-air blower to the outer surface of one of the walls 10 of the guide casing by means of a bracket 27' as shown in Figures 1 to 3, the blower could also be mounted on a surface 32 located on the guide casing at the level of the supporting surface 10 and to be machined jointly with the latter.

If after the removal of the compressor cylinder and closing of the crankcase by means of a cover plate 33 resting on the surface 10, the engine section of the unit is to be used as a driving machine, the walls 29, 30 forming the double spiral is replaced by the single outer spiral formed by wall 30' as shown in Figure 4 by which the entire cooling-air delivered by the blower is directed via the guide casing 34 towards the engine cylinder. In that case, the pulleys 35 mounted on the crankshaft permit the universal use of the engine section which on account of its liberal cooling can be put to a variety of uses.

I claim:

1. An air-cooled engine compressor with an engine cylinder and a compressor cylinder arranged perpendicular to each other, a common crankshaft and a crankcase having a supporting surface for said compressor cylinder, a blower designed as a turbo-compressor supplying the engine cylinder and the compressor cylinder with cooling air and located in the space between said engine and compressor cylinder, bearings for the crankshaft located in the sidewalls of the crankcase, a guide casing to guide the cooling air to the engine cylinder, said casing surrounding the engine-cylinder to provide a cooling air passage from said blower, the sidewalls of said crankcase being provided with extensions extending beyond the crankcase to form sidewalls for said guide casing and extending to the level of the supporting surface for the compressor cylinder on the crankcase and forming a surface of attachment for said cooling-air blower, said guide casing having an opening on the side of the compressor cylinder, a cooling-air blower closing said opening and including a rotor, said rotor being enclosed by a housing having two discharge passages each bounded by a volute-shaped wall, and one of said discharge passages arranged to discharge cooling air to the engine cylinder via said guide casing and the other said discharge passage arranged to discharge cooling air to said compressor cylinder, the said discharge passages being dimensioned to distribute the cooling air output of said blower according to the requirements respectively of said engine and said compressor cylinders.

2. An air-cooled engine compressor according to claim 1, wherein the rotor of the cooling-air blower protrudes into said guide casing for the cooling-air of the engine cylinder and the walls of the crankcase in the vicinity of the rotor are shaped as part of said spiral volute delivering the cooling-air to the engine cylinder.

3. An air-cooled engine compressor according to claim 1, wherein the engine cylinder includes a cylinder head, a closing wall interconnecting the said sidewalls of said guide casing along their outer edges remote from the crankcase and being located in the area of the engine cylinder head and shaped to direct cooling-air from said guide housing towards the engine cylinder head, said closing wall being formed integral with said engine cylinder head.

4. An air-cooled engine compressor according to claim 3, wherein a baffle is provided between the sidewalls of said guide casing and situated in the direction of the engine cylinder head so as to direct part of the cooling-air current from the guide housing towards the engine cylinder heads.

References Cited in the file of this patent

UNITED STATES PATENTS 2,215,266     Garelli _____ Sept. 17, 1940

FOREIGN PATENTS 1,070,078     France _____ Feb. 17, 1954